Patented July 31, 1945

2,380,697

UNITED STATES PATENT OFFICE 2,380,697

CARBOXYLIC ACID ESTERS OF S-ALKYLOL ISOTHIOUREAS

David W. Jayne, Jr., Old Greenwich, and Harold M. Day, Cos Cob, Conn., assignors to American Cyanamid Company, New York, N. Y., a corporation of Maine No Drawing. Application November 29, 1941, Serial No. 421,020

1 Claim. (Cl. 260—402.5)

This invention relates to the manufacture of cation active reagents and more particularly relates to the reaction products of carboxylic acid esters of halogen substituted aliphatic alcohols with thiourea or an N-substituted thiourea.

It is an advantage of the present invention that a new class of compounds, carboxylic acid esters of S-alkylol isothioureas, are provided which have a wide field of usefulness in the commercial arts and are especially well suited as promoters for acidic minerals.

Another advantage of the present invention is that a process of producing the above compounds is provided which is easily carried out and uniformly results in excellent yields.

Many further advantages will become apparent to those skilled in the art from the detailed description following hereafter.

The carboxylic acid esters of S-alkylol isothioureas produced in accordance with the present invention may be represented by the following general formula:

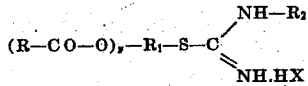

in which R is an alkyl, cycloalkyl, aralkyl, aryl, or heterocyclic radical, $y$ is a small whole number, $R_1$ is an alkyl radical having at least two carbon atoms, $R_2$ is hydrogen or an alkyl, aryl, aralkyl, or alicyclic radical or radical such as:

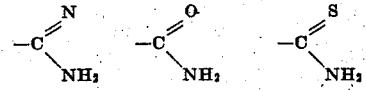

and X represents a halogen.

In general we have found that our compounds may be prepared by reacting a carboxylic acid ester of a halogen substituted aliphatic alcohol of the class of esters represented by the following general formula:

in which R is an alkyl, cycloalkyl, aralkyl or aryl radical, R' is an alkyl radical having at least two carbon atoms, X is a halogen, and $y$ is a small whole number, with thiourea or an N-substituted thiourea preferably in an acetic acid or alcoholic solution at the refluxing temperature of the solvent. The reaction probably proceeds according to the following reaction:

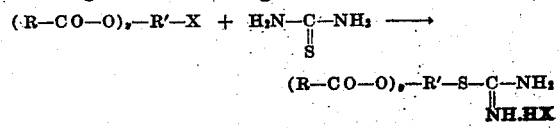

The invention will be described in greater detail in conjunction with the following specific examples. The examples are given by way of illustration only, and the invention is not to be limited by the details set forth therein.

Example 1

A mixture of 28 grams of the coconut fatty acid ester of ethylene chlorhydrin, 7.6 grams of thiourea, 100 cc. of anhydrous ethyl alcohol and 0.1 gram of potassium iodide was boiled under reflux for 48 hours. The reaction mix was then heated in an open dish on a steam bath to remove the alcohol. The product, coconut fatty acid esters of S-beta-hydroxy-ethyl isothiourea hydrochloride, was a waxy material, soluble in water to give a foamy solution. Crystallization of the crude product from acetone yielded glistening white plates, soluble in water to give a clear solution which foamed readily and wet wool.

Example 2

A mixture of 34.5 grams of the oleic acid ester of ethylene chlorhydrin, 7.6 grams of thiourea and 50 cc. of glacial acetic acid was boiled under reflux for six hours. The acetic acid was then removed from the reaction product by distillation under reduced pressure. The product, the oleic acid ester of S-beta-hydroxyethyl isothiourea hydrochloride was a light brown waxy material, completely soluble in water to give a foamy solution.

Example 3

Same procedure as Example 2.

The palmitic acid ester of beta-chlor ethyl alcohol _____ grams__ 22
Thiourea _____ do____ 5.5
Glacial acetic acid _____ cc___ 50

The product was a white waxy material, slightly soluble in cold water, but quite soluble in hot water to give a foamy solution. A portion of this product was crystallized first from a mixture of 10% water and 90% acetone, then from pure acetone. The purified product, S-(palmityl-beta-hydroethyl) isothiourea hydrochloride, consisted of glistening white plates melting at 125° C. The ionizable chlorine content of the product was found to be 8.984%. Theory is 8.999%.

The addition of equimolar proportion of dilute ammonia to an aqueous solution of this product precipitated the free S-(palmityl-beta-hydroethyl) isothiourea which is practically insoluble in water, but soluble in dilute aqueous hydrochloric acid, acetic acid, etc.

In the foregoing examples the particular carboxylic acid esters of the particular halogen substituted aliphatic alcohols may be replaced by the corresponding carboxylic acid esters of other acids and other halogen substituted aliphatic alcohols. It is readily seen, therefore, that R in the general formula may be derived from various carboxylic acids. Carboxylic acids generally may be employed, including monocarboxylic and polycarboxylic acids. The higher molecular weight organic monocarboxylic acids are usually preferred. Higher molecular weight monocarboxylic acids, straight-chain and branched-chain, aliphatic, and fatty acids, saturated and unsaturated, may be employed, representative ones being those such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above-mentioned acids or other acids, mixed higher fatty acids derived from animal or vegetable sources, for example, lard coconut oil, rapeseed oil, sesame oil, palm kernel oil, palm oil, olive oil, cornoil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxy-stearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, etc. Similarly, we may use carboxylic acids derived, by oxidation and other methods, from petroleum, cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid, hydroxy benzoic and naphthoic acids, and the like.

Various other halogen substituted aliphatic alcohols may be employed instead of the particular ones employed in the specific examples. For example, ethylene bromhydrin, beta-brom ethyl alcohol, glycerol bromhydrin, glycerol chlorhydrin, propylene chlorhydrin, propylene bromhydrin, butylene chlorhydrin, butylene bromhydrin, and the like. It is important that the halogen substituted aliphatic alcohol contain at least two carbon atoms inasmuch as the carboxylic acid esters of S-alkylol isothioureas wherein the alcohol radical contains only one carbon atom are relatively unstable as compared to the corresponding compounds having two or more carbon atoms in the alkylol chain. The carboxylic acid esters of halogen substituted aliphatic alcohols which we utilize in preparing our compounds include only those wherein the alkylol radical is of sufficient length to impart desirable properties to the isothiourea derivatives. We have not definitely determined what the upper limit of the carbon chain in the alkylol radical should be. We believe, however, that choosing the proper carboxylic acid permits considerable variation in the halogen substituted aliphatic alcohol employed. For example, a halogen substituted aliphatic alcohol having eight carbon atoms may be esterified with an acid containing four carbon atoms and an ester having a total carbon atom count of twelve obtained. On the other hand, we may use an aliphatic alcohol having four carbon atoms and a carboxylic acid having eight carbon atoms and in which case a carboxylic acid ester having a total carbon count of twelve would also be obtained. In many cases halogen substituted aliphatic alcohols having a plurality of hydroxy radicals may be employed, for example the halogen substituted glycols, glycerols, and the like. The use of this type halogen substituted alcohol permits considerable variations, for example a mono-halogen substituted glycerol may be esterified with one or two mols of a carboxylic acid as desired since there are two hydroxy groups capable of being esterified.

The carboxylic acid esters of halogen substituted aliphatic alcohols employed in producing the compound of this invention may be readily prepared by the ordinary esterification methods and their method of preparation is not a part of the present invention.

In a preferred method of preparing our preferred compounds thiourea is reacted with a long-chain fatty acid ester of a halogen substituted aliphatic alcohol, such as ethylene chlorhydrin. When desired, however, we may utilize N-substituted thioureas, such as for example, N-ethyl thiourea, N-benzyl thiourea, N-phenyl thiourea, N-cyclohexyl thiourea, guanyl thiourea, thioburiet, dithioburiet, or the like.

The various arts in which the compounds of the invention may be used commercially are widely diversified. In general, however, these compounds may be employed for the following uses among others:

1. Wetting or surface tension reducing agents.
2. Detergents.
3. Emulsifiers or dispersing agents.
4. Demulsifiers.
5. Lubricants.
6. Dye assistants.
7. Ore dressing.
8. As aids in chemical reactions.

We claim:

The process of producing carboxylic acid esters of S-alkylol isothioureas which comprises heating an ester of a halogen-substituted aliphatic alcohol containing at least two carbon atoms and a carboxylic acid, selected from the group consisting of those derived from cocoanut-oil fatty acids, oleic acid and palmitic acid, with a substance selected from the group consisting of thiourea and N-substituted thioureas in an anhydrous solvent.

DAVID W. JAYNE, Jr.
HAROLD M. DAY.